June 20, 1939.　　　　W. DE LONG　　　　2,163,486
WELDER HANDLE
Filed March 30, 1937
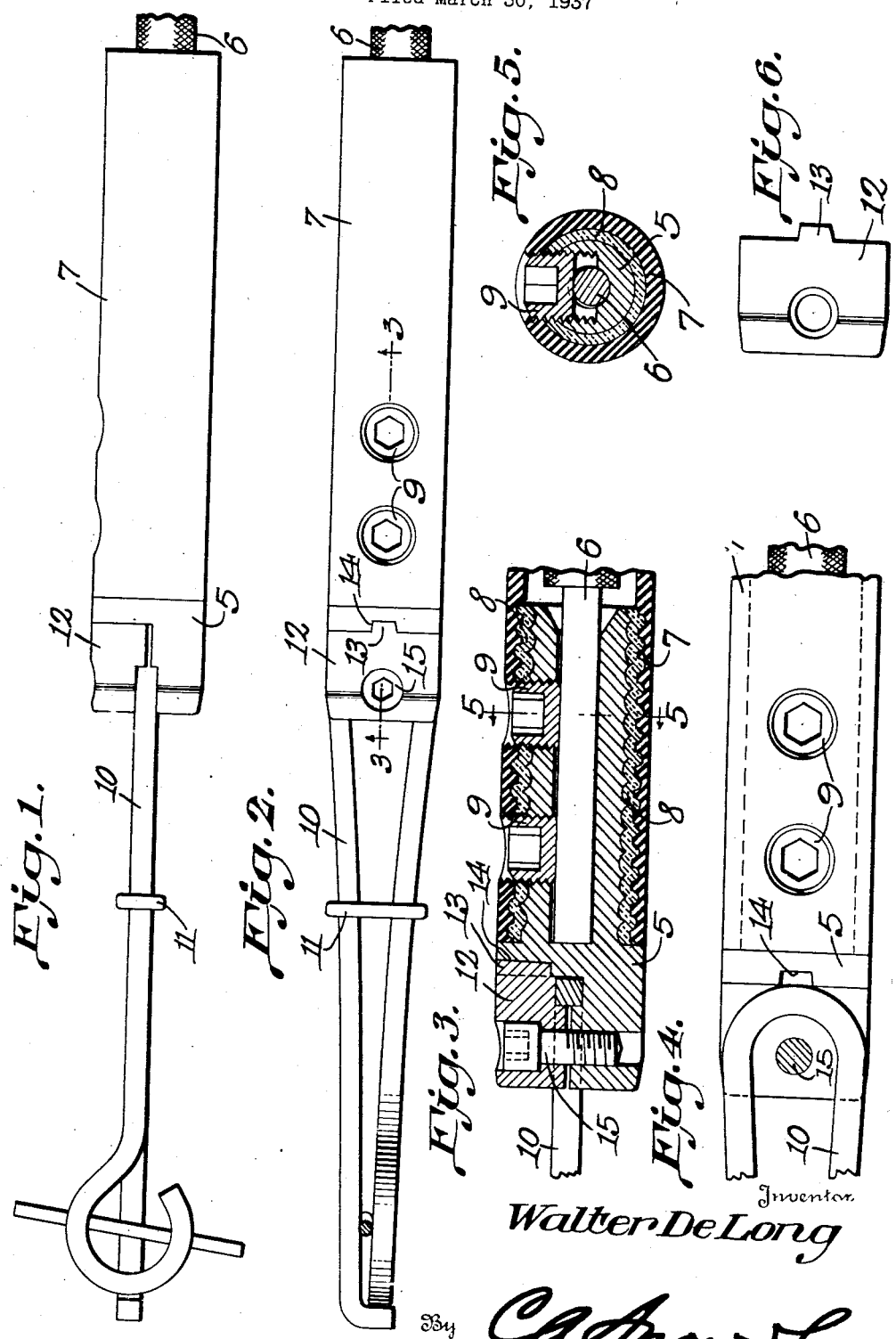
Inventor
Walter De Long
By C. A. Snow & Co.
Attorney.

Patented June 20, 1939

2,163,486

UNITED STATES PATENT OFFICE 2,163,486

WELDER HANDLE

Walter De Long, Southgate, Calif.

Application March 30, 1937, Serial No. 133,896

1 Claim. (Cl. 219—8)

This invention relates to welding tongs employed in holding the welding rod during the welding operation.

An important object of the invention is to provide welding tongs wherein the welding rod holder is of the removable type, novel means being provided for securing the welding rod holder in such a way that the welding rod holder may be readily removed and replaced when the holder becomes burned out or otherwise rendered inoperative.

A further object of the invention is the provision of means for securing the welder rod holder to the handle of the tool, insuring against twisting of the welder rod handle or holder, while in use.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is an elevational view of welding tongs constructed in accordance with the invention.

Figure 2 is a side elevational view thereof.

Figure 3 is a fragmental sectional view taken on line 3—3 of Figure 2.

Figure 4 is an enlarged fragmental elevational view of the welding tongs.

Figure 5 is a sectional view taken on line 5—5 of Figure 3.

Figure 6 is a view illustrating the removable member employed in securing the welding rod holder to the handle.

Referring to the drawing in detail, the reference character 5 designates the body portion of the handle, which is formed with a bore extended longitudinally thereof, for the reception of the conducting wire 6.

The handle of the device is indicated by the reference character 7, and is constructed of insulating material. Disposed between the body portion 5 and handle 7, is a layer of heat insulating material indicated by the reference character 8.

Threaded openings are formed in the body portion, and accommodate the screws 9 which contact with the conducting wire 6, securing the wire in position within the handle.

As clearly shown by Figure 3 of the drawing one end of the body portion is cut away and formed with a circular groove to accommodate the tongs 10, the outer ends of the tongs being held in clamping relation with each other, by means of the ring 11, slidable over the tongs.

The reference character 12 designates a removable securing member, forming a part of the body portion, the removable securing member having a rib 13 formed at one end thereof, to fit within the vertical groove 14 formed within the body portion, so that the removable member 12 will be held against lateral movement. The removable member 12 is formed with a cutaway portion conforming to the shape of the curved inner end of the tongs, so that the tongs will be held against movement when positioned.

An opening is formed in the removable member 12, the opening registering with a threaded opening in the body portion 5, so that the securing bolt 15 may pass through the member 12 and secure the member 12 in position on the tongs of the welder holder.

From the foregoing it will be seen that due to the construction shown and described, the tongs may be readily removed and replaced when the tongs become burned out or otherwise rendered inoperative, thereby eliminating the necessity of discarding the entire tool, when the tongs are defective.

Having thus described the invention, what is claimed is:

A welder's tongs comprising a body portion, one end of the body portion being cut away providing a curved wall and a clamping surface, said curved wall having a vertical groove, said clamping surface having a groove therein, a tong section embodying a length of spring metal bent intermediate its ends providing yieldable arms, one end of the tong section being held within the groove of the clamping surface, a removable member positioned over the tong section held in said groove, a vertical rib on the removable member and positioned within the groove in the curved wall positioning the removable member on the body portion, clamping jaws at the free ends of the arm, and adapted to clamp an electrode, and a bolt extending through the removable member and into the body portion, securing the removable member in position.

WALTER DE LONG.